Patented Mar. 19, 1946

2,396,963

UNITED STATES PATENT OFFICE 2,396,963

REACTION PRODUCTS OF ACRYLONITRILE WITH MACROMOLECULAR KETONES

Carl Walter Mortenson, Wilmington, Del., assignor to E. I. du Pont de Nemours & Company, Wilmington, Del., a corporation of Delaware No Drawing. Application February 22, 1944, Serial No. 523,483

8 Claims. (Cl. 260—63)

This invention relates to polymeric materials and more particularly to linear polymeric alpha (beta-cyanoethyl) ketones. By polymeric alpha (beta-cyanoethyl) ketones are meant those macromolecular ketones which have one or more beta-cyanoethyl groups attached to an aliphatic carbon atom contiguous to the carbonyl group in a number of the ketone carbonyl-containing polymer units of the molecule.

It is an object of this invention to prepare new compositions of matter. A further object is the preparation of polymeric ketones, preferably linear, containing beta-cyanoethyl groups. Further objects will appear hereinafter.

These objects are accomplished by the following invention which comprises reacting a linear polymeric ketone, having recurring polymer units containing an aliphatic carbon bearing at least two hydrogen atoms contiguous to a ketone carbonyl group, with acrylonitrile in the presence of an alkaline condensing agent. The products are polymeric ketones in which a number of the polymer units have at least one beta-cyanoethyl group on the aliphatic carbon contiguous to the carbonyl carbon.

In the most satisfactory method of carrying out this reaction, the ketone polymer is dissolved in an inert solvent, i. e., a solvent unreactive with acrylonitrile, e. g., dioxan, and the acrylonitrile and the alkaline agent added slowly with agitation, the temperature of the reaction mixture being maintained within the range of 25 to 50° C. Since the reaction is exothermic, cooling is usually necessary to control the reaction and to prevent undesirable side reactions which occur at the higher temperatures. The reaction is complete when evolution of heat is no longer apparent.

The reaction is applicable to any polymeric ketone containing at least two hydrogen atoms attached to a carbon adjacent to a carbonyl group. Preferably the polymeric ketone is soluble in an inert organic solvent. The preparation of a typical polymeric ketone useful in this reaction is as follows:

*Example A*

A silver-lined reaction vessel was charged with 0.5 part by weight of diethyl peroxide and 100 parts by weight of purified dioxan. The vessel was closed, evacuated and charged by pressuring at 600 atmospheres with a gas mixture consisting of 30% carbon monoxide and 70% ethylene by weight. The reaction mixture was maintained at a temperature of about 130° C. and the pressure maintained between 600 and 700 atmospheres by repressuring with the gas mixture for a period of 18 hours. The polymer was isolated by steam-distillation of the dioxan followed by filtration and drying. In this way 90 parts by weight of a white wax-like product melting at about 130° C. was obtained. This product showed on analysis 67.34% carbon, 8.47% hydrogen, indicating a 43% carbon monoxide content in the polymer.

The more detailed practice of the invention is illustrated by the following examples, wherein parts given are by weight. There are, of course, many forms of the invention other than these specific embodiments.

*Example I*

A solution of five parts of ethylene/carbon monoxide interpolymer, prepared as in Example A, in 20 parts of dioxan was prepared and ten parts of acrylonitrile and two parts of a 40% aqueous solution of trimethylbenzylammonium hydroxide were concurrently added with agitation over a period of about one hour. The materials reacted exothermally, and external cooling of the reaction mixture was necessary to maintain the temperature between 35 and 40° C. The reaction products which were soluble in the reaction mixture were precipitated by pouring the solution with vigorous agitation into an excess of water. The product was a light-yellow solid which was insoluble in water but which was soluble in organic solvents, e. g., acetone or pyridine. The product after drying was analyzed and was found to contain 67.9% carbon, 6.62% hydrogen and 15.3% nitrogen, corresponding to the introduction of 1.71 beta-cyanoethyl groups per carbonyl group in the polymer.

*Example II*

Fifty parts of acrylonitrile and 12 parts of a 40% aqueous solution of trimethylbenzylammonium hydroxide were concurrently added slowly with agitation over a period of about 1.5 hours to a solution of 20 parts of ethylene/carbon monoxide interpolymer (prepared as in Example A) in 100 parts of dioxan. The exothermic reaction resulting was controlled by external cooling and the temperature of the reaction mixture was maintained at 30 to 35° C. The product which was a light-yellow solid was isolated as in Example I. After drying the product was shown by analysis to contain 10.96% nitrogen corresponding to the introduction of 0.81 beta-cyanoethyl group per carbonyl group in the polymeric compound.

Example III

A ketone polymer containing beta-cyanoethyl groups was prepared by a reaction similar to that given above and analyzed to show 6.74% N, 69.14% C, 7.41% H, equivalent to 0.4 beta-cyanoethyl group per carbonyl group. Ten parts of this polymer was refluxed with 120 parts of 16% aqueous sodium hydroxide solution for about six hours in order to hydrolyze the nitrile groups. The material, originally insoluble in the reaction mixture, dissolved slowly and ammonia was liberated. The polycarboxylic acid prepared by this reaction was precipitated upon acidification of the reaction mixture. After filtration and drying the product contained by analysis 55.40% carbon, 6.32% hydrogen and 1.29% nitrogen.

Example IV

Six parts of a propylene/ethylene/carbon monoxide interpolymer containing 41.4% carbon monoxide and prepared by peroxide-catalyzed high pressure polymerization of the mixed gases by a method similar to Example A, was dissolved in 50 parts of dioxan. To the agitated solution was added 15 parts of acrylonitrile simultaneously with one part of a 40% aqueous solution of trimethylbenzylammonium hydroxide over a period of about one hour. The exothermic reaction was controlled by external cooling and the temperature of the reaction mixture was maintained at about 35° C. The completion of the reaction was indicated by the absence of further heat evolution. The product was isolated as indicated in Example I and the solid product thus obtained, after drying, contained by analysis 7.62% nitrogen, corresponding to the introduction of 0.6 beta-cyanoethyl group per carbonyl group in the polymer molecule. When the product was heated with concentrated aqueous sodium hydroxide solution, it dissolved slowly and liberated ammonia.

Example V

Seven parts of methyl vinyl ketone polymer was dissolved in about 100 parts of dioxan. Thirty parts of acrylonitrile and seven parts of a 40% aqueous solution of trimethylbenzylammonium hydroxide were simultaneously added slowly with agitation over a period of about one hour while the temperature in the reaction mixture was maintained at about 35 to 40° C. by external cooling. The product was isolated as in Example I and, after drying, was shown by analysis to contain 12.4% nitrogen, corresponding to the introduction of 1.25 cyanoethyl groups per carbonyl group in the polymer. When heated with concentrated aqueous sodium hydroxide solution, the product liberated ammonia readily.

The polymeric ketones which can be reacted with acrylonitrile in accordance with this invention are all polymeric compounds having in the polymer unit a ketonic carbonyl group having contiguous thereto an aliphatic carbon atom bearing at least two hydrogen atoms. By a polymeric ketone is meant a compound having a molecular weight of at least 1000 and having multiply recurring structural units containing a ketonic carbonyl group. Among the polymeric ketones which are useful to this invention are the olefin/carbon monoxide copolymers, for example, ethylene/carbon monoxide copolymers; propylene/ethylene/carbon monoxide copolymers; alkyl vinyl ketone polymers, for example, methyl vinyl ketone polymer; other alpha, beta-ethylenically unsaturated ketone polymers, for example, methyl isopropenyl ketone polymer; olefin/alkyl vinyl ketone copolymers, for example, ethylene/methyl vinyl ketone copolymers; copolymers of alpha, beta-ethylenically unsaturated ketones with conjugated dienes, for example, methyl vinyl ketone/butadiene copolymers; methyl vinyl ketone/chloroprene copolymers; benzalacetone/butadiene copolymers and the like. In addition, other copolymers of the alpha, beta-ethylenically unsaturated ketones with polymerizable vinyl and vinylidine compounds, for example, copolymers of methyl vinyl ketone with vinyl acetate, vinyl chloride, methyl methacrylate, and the like may be used. The only requirement is that the polymeric ketones contain polymer units having at least two hydrogen atoms on an aliphatic carbon contiguous to the carbonyl group. Preferably the polymeric ketones are soluble in organic solvents, i. e. are linear polymers.

The products obtained by reaction of the polymeric ketones as above defined with acrylonitrile are beta-cyanoethyl derivatives of the polymeric ketones having the beta-cyanoethyl group attached to a carbon contiguous to the carbonyl group. They are, in general, solids which are insoluble in water but are soluble in organic solvents. They may contain on the average from 0.1 to 4 beta-cyanoethyl groups per carbonyl group in the polymer unit of the polymeric ketone, depending on the amount of acrylonitrile used and the reaction conditions. From 0.1 to 4 or more mols of acrylonitrile per ketone carbonyl group may be used to give a satisfactory reaction. Preferably from 1 to 2 mols are employed since this gives a suitable product without use of an excessive amount of acrylonitrile.

The polymeric alpha (beta-cyanoethyl) ketones are useful as insecticides or in thermosetting compositions. By virtue of the reactivity of the nitrile groups, these new polymeric ketones may be used as intermediates in the preparation of new polymeric polyamides, polycarboxylic acids, polyesters, polyamines, polyamidines, polyaminoacids, polycyanoacids, polyaminoalcohols, or polythioamides. The new polymeric compositions derived from the beta-cyanoethyl substituted ketones, by further reaction have diverse uses, for example, the polyacids derived therefrom by acid or alkaline hydrolysis are useful as tanning agents and dispersing agents. This reaction provides a new route to polymeric ketone compositions having a variety of functional groups in addition to the ketone carbonyl groups.

The alkaline condensing agents useful for promoting this reaction are the oxides, hydroxides, amides, and alcoholates of the alkali metals, or the strongly basic, non-metallic hydroxides for example, quaternary ammonium hydroxides. These agents include sodium ethylate, sodium methylate, potassium hydroxide, sodium hydroxide, tetramethyl-ammonium hydroxide and the like. A preferred composition is the trimethylbenzylammonium hydroxide employed in the examples. Only small amounts of the condensing agent are required and from 1 to 10% based on the total weight of the reacting materials is usually sufficient.

Temperatures from 0° to 75° C. may be used in this reaction although temperatures from 25° to 50° C. are preferred. The reaction is exothermic so that cooling is required during the first part of the condensation in order to control the reaction and prevent undesirable polymerization of the acrylonitrile or other side reactions. The reaction is usually accomplished in from one to two hours but longer or shorter times may be employed depending on the degree of reaction desired. The reaction is generally carried out in an inert solvent for example, dioxan or ether which does not react with acrylonitrile.

The above description and examples are intended to be illustrative only. Any modification of or variation therefrom which conforms to the spirit of the invention is intended to be included in the scope of the claims.

What is claimed is:

1. A polymeric ketone having a molecular weight of at least 1000, having multiply recurring structural units containing a ketone carbonyl group, and having a plurality of recurring units containing at least one beta-cyanoethyl group on a carbon contiguous to the ketone carbonyl.

2. A linear polymeric ketone having a molecular weight of at least 1000, having multiply recurring structural units containing a ketone carbonyl group, and having a plurality of recurring units containing at least one beta-cyanoethyl group on a carbon contiguous to the ketone carbonyl.

3. A linear polymer having a molecular weight of at least 1000, having multiply recurring structural units containing a ketone carbonyl group, and having recurring structural units having a beta-cyanoethyl group on a carbon alpha to a ketone carbonyl group.

4. A beta cyanoethyl substituted copolymer of ethylene and carbon monoxide having a molecular weight of at least 1000 and multiply recurring structural units containing a ketonic carbonyl group, the beta cyanoethyl substituents being on carbons contiguous to ketone carbonyl groups.

5. Process which comprises reacting acrylonitrile at 25° to 50° C. in the presence of trimethylbenzylammonium hydroxide as a catalyst with a copolymer of ethylene and carbon monoxide, said copolymer having a molecular weight of at least 1000, having multiply recurring structural units containing a ketonic carbonyl group, and having contiguous to said carbonyl group an aliphatic carbon bearing at least two hydrogen atoms.

6. Process which comprises reacting acrylonitrile at 25° to 50° C. in the presence of an alkaline catalyst with a copolymer of ethylene and carbon monoxide, said copolymer having a molecular weight of at least 1000, having multiply recurring structural units containing a ketonic carbonyl group, and having contiguous to said carbonyl group an aliphatic carbon bearing at least two hydrogen atoms.

7. Process which comprises reacting acrylonitrile at 0° to 75° C. in the presence of an alkaline catalyst with a linear polymeric ketone said ketone having a molecular weight of at least 1000, having multiply recurring structural units containing a ketonic carbonyl group, and having contiguous to said carbonyl group an aliphatic carbon bearing at least two hydrogen atoms.

8. Process which comprises reacting acrylonitrile at 0° to 75° C. in the presence of an alkaline catalyst with a polymeric ketone said ketone having a molecular weight of at least 1000, having multiply recurring structural units containing a ketonic carbonyl group, and having contiguous to said carbonyl group an aliphatic carbon bearing at least two hydrogen atoms.

CARL WALTER MORTENSON.